US012411398B2

(12) United States Patent
Wei et al.

(10) Patent No.: US 12,411,398 B2
(45) Date of Patent: Sep. 9, 2025

(54) MODULAR SMARTPHONE MICROSCOPY DEVICE FOR MULTIMODAL IMAGING

(71) Applicant: NORTH CAROLINA STATE UNIVERSITY, Raleigh, NC (US)

(72) Inventors: Qingshan Wei, Raleigh, NC (US); Shengwei Zhang, Raleigh, NC (US)

(*) Notice: Subject to any disclaimer, the term of this patent is extended or adjusted under 35 U.S.C. 154(b) by 295 days.

(21) Appl. No.: 18/034,803

(22) PCT Filed: Nov. 2, 2021

(86) PCT No.: PCT/US2021/057670
§ 371 (c)(1),
(2) Date: May 1, 2023

(87) PCT Pub. No.: WO2022/098623
PCT Pub. Date: May 12, 2022

(65) Prior Publication Data
US 2023/0412905 A1 Dec. 21, 2023

Related U.S. Application Data

(60) Provisional application No. 63/108,902, filed on Nov. 3, 2020.

(51) Int. Cl.
*G03B 17/56* (2021.01)
*G02B 21/00* (2006.01)
(Continued)

(52) U.S. Cl.
CPC ....... *G03B 17/565* (2013.01); *G02B 21/0008* (2013.01); *G02B 21/12* (2013.01); *G02B 21/16* (2013.01); *G02B 21/362* (2013.01)

(58) Field of Classification Search
CPC .. G03B 17/565; G02B 21/0008; G02B 21/12; G02B 21/16; G02B 21/362
(Continued)

(56) References Cited

U.S. PATENT DOCUMENTS 8,786,695 B2 7/2014 Fletcher et al.
9,310,300 B2 4/2016 Alt et al.
(Continued)

FOREIGN PATENT DOCUMENTS

WO 2014107364 A1 7/2014
WO 2014113770 A1 7/2014
(Continued)

OTHER PUBLICATIONS

Trofymchuk, Kateryna, et al., Addressable Nanoantennas with Cleared Hotspots for Single-Molecule Detection on a Portable Smartphone Microscope, bioRxiv preprint, Apr. 9, 2020 [online], [retrieved on Apr. 20, 2023]. Retrieved from the Internet <URL: https://www.biorxiv.org/content/10.1101/2020.04.09.032037v1>.
(Continued)

*Primary Examiner* — Allen C Wong
(74) *Attorney, Agent, or Firm* — Jennifer R. Knight

(57) ABSTRACT

The present invention provides methods and systems for a multimodal, portable imaging platform that can be easily installed on a mobile phone or other mobile communication devices carrying a camera. The portable imaging system includes an electronic device with a camera, a base attachment, and at least two interchangeable imaging heads. The base attachment is configured to connect to the digital device on one side and at least two removable, interchangeable imaging heads on the other side. The connected imaging head is in optical communication with the camera. Switching between different imaging modalities is as simple as switching between the interchangeable imaging heads. Each removable imaging head contains its own light source (or is optically connected to a laser diode disposed in the base attachment), lens, and/or optical filters that can be attached quickly to the same base attachment.

20 Claims, 13 Drawing Sheets

(51) Int. Cl.
 *G02B 21/12* (2006.01)
 *G02B 21/16* (2006.01)
 *G02B 21/36* (2006.01)
(58) Field of Classification Search
 USPC .......................................................... 348/79
 See application file for complete search history.

(56) References Cited

U.S. PATENT DOCUMENTS

| | | | |
|---|---|---|---|
| 9,322,767 | B2 | 4/2016 | Ehrenkranz |
| 9,787,815 | B2 | 10/2017 | Erickson et al. |
| 10,495,863 | B2 | 12/2019 | Lin et al. |
| 10,571,395 | B2 | 2/2020 | Karlovac et al. |
| 10,663,466 | B2 | 5/2020 | Ozcan et al. |
| 2011/0009163 | A1* | 1/2011 | Fletcher ............... G02B 21/16 455/556.1 |
| 2012/0157160 | A1 | 6/2012 | Ozcan et al. |
| 2012/0218379 | A1 | 8/2012 | Ozcan et al. |
| 2013/0209954 | A1* | 8/2013 | Prakash ............ A61B 1/00172 433/29 |
| 2014/0267670 | A1 | 9/2014 | Tipgunlakant et al. |
| 2016/0045114 | A1 | 2/2016 | Dacosta et al. |
| 2016/0070092 | A1 | 3/2016 | Ozcan et al. |
| 2017/0045724 | A1 | 2/2017 | Lin et al. |
| 2017/0068084 | A1 | 3/2017 | Schwitzer |
| 2017/0126943 | A1 | 5/2017 | Fletcher et al. |
| 2017/0160197 | A1 | 6/2017 | Ozcan et al. |
| 2019/0346369 | A1 | 11/2019 | Ozcan et al. |

FOREIGN PATENT DOCUMENTS

| | | |
|---|---|---|
| WO | 2016019235 A1 | 2/2016 |
| WO | 2016205736 A1 | 12/2016 |
| WO | 2017025984 A1 | 2/2017 |

OTHER PUBLICATIONS

Vietz, Carolin, et al., Benchmarking Smartphone Fluorescence-Based Microscopy with DNA Origami Nanobeads: Reducing the Gap toward Single-Molecule Sensitivity, ACS Omega 2019, 4, pp. 637-642.

Wei, Qingshan, et al., Flourescent Imaging of Single Nanoparticles and Viruses on a Smart Phone, ACS Nano, vol. 7, No. 10. (2013), pp. 9147-9155.

Wei, Qingshan, et al., Plasmonics Enchanced Smartphone Fluorescence Microscopy, Scientific Reports 7 (2124) https://doi.org/10.1038/s41598-017-02395-8 [online], [retrieved on Apr. 20, 2023]. Retrieved from the Internet <URL https://www.nature.com/articles/s41598-017-02395-8>.

Feb. 18, 2022, International Search Report Issued in International Application No. PCT/US2021/057670.

* cited by examiner

MODULAR SMARTPHONE MICROSCOPY DEVICE FOR MULTIMODAL IMAGING

CROSS-REFERENCE

This application claims the benefit of PCT Application PCT/US21/57670 filed on Nov. 2, 2021, which claims the benefit of U.S. Provisional Patent Application Ser. No. 63/108,902 filed on Nov. 3, 2020, both of which are incorporated herein by reference in their entirety.

This invention was made with government support under grant number 1944167 awarded by the National Science Foundation. The government has certain rights in the invention.

TECHNICAL FIELD

The present invention relates generally to devices and methods for microscopic analysis of structures. More specifically, the present invention relates to robust, portable microscopic tools and methods which enable multimodal analysis.

BACKGROUND

Recently, smartphone microscopy has received increasing attention in mobile health and point-of-care (POC) diagnostics, including cell imaging, cell counting, tissue slice imaging, and immunoassay quantification. Biomarkers such as proteins and nucleic acids can be quantified from human samples with the help of various kinds of analytical assays. Currently, a number of imaging modalities have been developed on smartphone platforms, including brightfield imaging, lens-free holographic imaging, dark-field scattering imaging, and fluorescence imaging. Some of the smartphone-based microscopy platforms are capable of acquiring high-definition images with quality comparable to a benchtop optical microscope. On the other hand, a modern benchtop optical microscope has multiple filter cubes to allow one to easily switch between different imaging modes, such as brightfield, darkfield, phase contrast, and multi-color fluorescence imaging. Unlike their benchtop counterparts, however, most currently reported smartphone imaging platforms are only capable of conducting one type of imaging at a time. While a few multimodal smartphone microscopy devices have been recently demonstrated, they are limited to the number of imaging modalities that can be integrated (typically 2-3), sacrificed performance compared to single-mode imaging devices, or restricted sample formats (e.g., transparent vs. opaque substrates) that can be imaged.

Difficulty on multi-modality imaging on a single smartphone device has imposed a significant challenge for POC applications, where different imaging modalities are needed for accurate disease diagnostics. One such example is the need to obtain the morphology of tumor tissue slides (brightfield) and biomarker expression level (fluorescence) on the same sample quickly in cancer diagnostics. There is a need for a low-cost, portable mobile phone microscopy platform capable of doing total analytics (e.g., imaging, scanning, and counting of biospecimens with both colorimetric and fluorescent signals) on a simple device.

There is a need for robust, portable imaging platforms that can readily change/reconfigure imaging modality or imaging capabilities within an imaging modality within several minutes on the detection site. There is also a need for on-site image registration, processing, and analysis to be carried out quickly on a mobile phone, which is especially useful where data transmission between the phones is difficult such as in remote areas.

Most existing smartphone fluorescence imaging devices utilize a transmissive optical illumination configuration, and thus, only transparent samples such as glass slides, clear solutions, or thin slices could be imaged. There is a need to be able to image opaque specimens, such as assay devices made of solid silicon or metal substrates and paper-based dipstick test strips (e.g., lateral flow assay) with a portable imaging device. The ability to image opaque samples would also allow the imaging of thick biopsy specimen tissues and scanning human skins by using the mobile imaging devices.

There is a need for a portable imaging platform that provides easy customization, for example of different magnifications or fluorescence color channels, by using different objective lenses or fluorescence filter sets in a way that is easily and robustly changed in the field.

SUMMARY

According to an embodiment of the present invention, a portable imaging platform comprises a) a portable electronic device, b) a base attachment, and c) at least two interchangeable imaging heads. The portable electronic device has a camera element. The base attachment is configured for a first side to separably connect to the portable electronic device and for a second side, reverse to the first side, to separably connect to one of the interchangeable imaging heads. Each of the interchangeable imaging heads is configured to separably connect to the second side of the base attachment. The interchangeable imaging head secured to the base attachment is optically coupled to the camera element. Each of the interchangeable imaging heads is configured to send a unique optical signal to the camera element.

According to yet another embodiment of the present invention, a portable microscopy method utilizes a portable imaging platform comprising, a) a portable electronic device, b) a base attachment, and c) at least two interchangeable imaging heads. The portable electronic device has a camera element. The base attachment is configured for a first side to separably connect to the portable electronic device and for a second side to separably connect to an interchangeable imaging head. Each of the interchangeable imaging heads is configured to separably secure to the second side of the base attachment. The interchangeable imaging head secured to the base attachment is optically coupled to the camera element. Each of the interchangeable imaging heads is configured to send a unique optical signal to the camera element. The base attachment comprises a laser diode, at least one battery, and a switch. Each of the interchangeable imaging heads comprises a light source disposed therein and/or is optically connected to the laser diode. The light source and/or the laser diode is configured to produce an excitation light. Access to a sample is provided by 1) a sample holder disposed within at least one of the interchangeable imaging heads and positioned in an optical path between the excitation light and the camera element, wherein the sample holder is configured to accept a sample and/or 2) the reflective optical path of the excitation light of at least one of the interchangeable imaging heads is configured to exit the interchangeable imaging head through a port, strike an external sample, and reflect back into the interchangeable imaging head through the port. The method comprises the steps of a) attaching a first one of the interchangeable imaging heads to the base attachment; b) prepping for sample analysis by 1) loading a sample into the sample holder, if the sample holder is disposed in the attached interchangeable image head, or 2) aiming the portable imaging platform at a sample, whereby the port and the sample are in optical communication, if the attached interchangeable imaging head has a port; c) illuminating the sample with the excitation light; and sending the unique optical signal to the camera element.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1b a side view of the base attachment of FIG. 1a;

FIG. 2b is a side view of the detached brightfield imaging head of FIG. 2a;

FIG. 3b is a side view of the detached epifluorescence imaging head of FIG. 3a;

FIG. 4a is an enlarged image of a region of interest (ROI) in a transmission image of the USAF 1951 resolution test target captured using a brightfield imaging device;

FIG. 4b is an enlarged image of a ROI in a transmission image of the USAF 1951 resolution test target captured using the epifluorescence imaging device;

FIG. 4c is a graphical representation of the line intensity profiles corresponding to the vertical and horizontal lines in FIG. 4a;

FIG. 4d is a graphical representation of the line intensity profiles corresponding to the vertical and horizontal lines in FIG. 4b;

FIG. 6a is the same unprocessed transmission image of the USAF 1951 resolution test target shown in FIG. 4a;

FIG. 6b is the deconvoluted transmission image of the USAF 1951 resolution test target shown in FIG. 6a;

FIG. 6c is a graphical representation of the line intensity profiles corresponding to the vertical lines in FIGS. 6a and 6b, before and after deconvolution;

FIG. 6d is a graphical representation of the line intensity profiles corresponding to the horizontal lines in FIGS. 6a and 6b, before and after convolution;

FIG. 6e is side-by-side comparison between an unprocessed image and a deconvoluted image from a fine-needle aspiration (FNA) sample of breast tumor tissue;

DETAILED DESCRIPTION

Figure 1A:
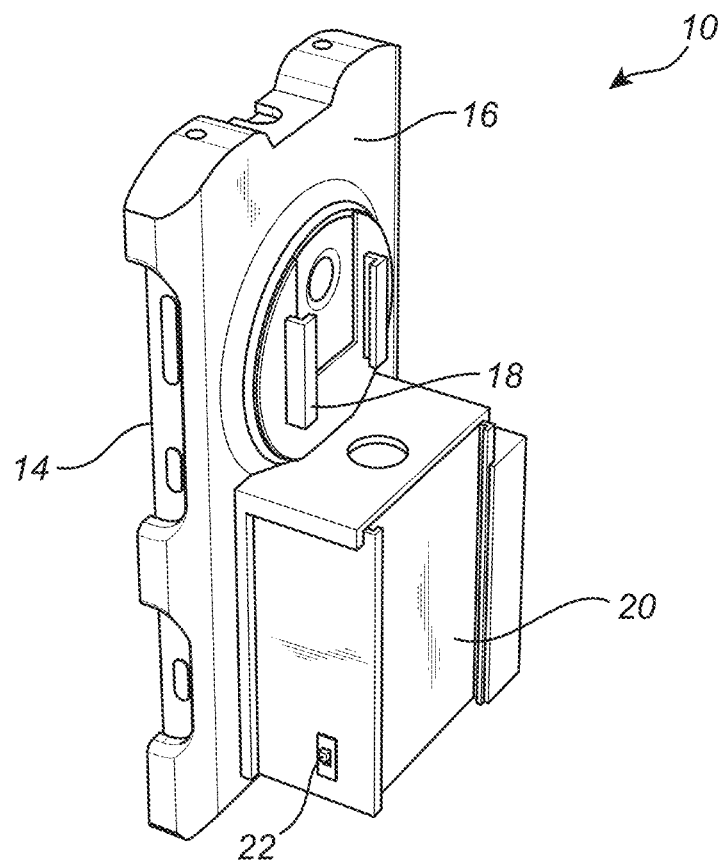
FIG. 1a is a perspective view of the base attachment of an embodiment of the present invention.

According to an embodiment of the present invention, a portable imaging platform comprises a) a portable electronic device, b) a base attachment, and c) at least two interchangeable imaging heads. The portable electronic device has a camera element. The base attachment is configured for a first side to separably connect to the portable electronic device and for a second side, reverse to the first side, to separably connect to one of the interchangeable imaging heads. Each of the interchangeable imaging heads is configured to separably connect to the second side of the base attachment. The interchangeable imaging head secured to the base attachment is optically coupled to the camera element. Each of the interchangeable imaging heads is configured to send a unique optical signal to the camera element.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used herein, the term "and/or", when used in a list of two or more items, means that any one of the listed items can be employed by itself, or any combination of two or more of the listed items can be employed. For example, if a composition is described as containing compounds A, B, "and/or" C, the composition may contain A alone; B alone; C alone; A and B in combination; A and C in combination; B and C in combination; or A, B, and C in combination.

As used herein, the term "imaging head", refers to a housing containing all of the elements needed to perform a specific modality of microscopy, with the exception of a laser diode, if required. Nonlimiting examples of elements that may be included in an "imaging head" are lenses, diffusers, a light source, a sample holder, a focusing stage, mirrors, and filters. If a laser diode is required, the "imaging head" is configured to be in optical communication with the laser diode in the base attachment. Each imaging head only needs to have the elements required for that particular imaging head's microscopic modality. As a self-contained unit, "imaging heads" allow for one-step change-out between modalities.

As used herein, the term "interchangeable imaging head", refers to the ability to switch between imaging heads on a single portable microscopy platform. Each of the imaging heads can (successively) secure to the same base attachment.

As used herein, the term "unique optical signal", refers to the multi-functional capability of the portable microscopy platform in that each imaging head is materially different than the other imaging heads, and as such, none of the imaging heads produce the same optical signal. This is the case even if the two imaging heads are being used to characterize the same sample. The material difference can be in the modality of microscopy, such as one imaging head configured for brightfield microscopy and another imaging head configured for epifluorescence microscopy. The material difference can be in some other aspect, such as magnification, in two imaging heads having the same microscopic modality.

As used herein, the term "external sample", refers to a sample that is not disposed within the imaging head. In some modalities, such as epifluorescence, the portable microscopy platform has the ability to perform as a "reader".

As used herein, the term "z direction", refers to the direction of the optical path between the excitation light and the objective lens. This allows the sample to be moved closer or further from the objective lens for focusing.

The portable microscopy platform combines at least dual functions on a single device, for example, brightfield imaging for cytology slide inspection and fluorescence imaging for assay quantification. The portable microscopy platform adopts modular design with interchangeable imaging heads to change between imaging modalities based on the following considerations: 1) it protects the optical integrity of each imaging mode to the maximum extent, by keeping key optical elements together and only switching the entire imaging head at a time; 2) Because of this, it also provides more flexibility on the choice of optical components. For instance, two different focal length external lenses can be used for two interchangeable imaging heads to meet different application needs, which is not possible in the previous multimodal smartphone microscopy design.

The portable imaging platform comprises a portable electronic device having a camera element. In some aspects, the portable electronic device is a smartphone, and the camera element comprises a lens and an image sensor.

The portable imaging platform comprises at least two interchangeable imaging heads. In some aspects, one or more of the interchangeable imaging heads is configured to operate in a modality of brightfield microscopy, fluorescence microscopy, dark-field scattering microscopy, polarization microscopy, and/or phase contrast microscopy. In some aspects, each of the interchangeable imaging heads is configured to image a sample disposed within the interchangeable imaging head or to image a sample exterior to the interchangeable imaging head. In some aspects, each of the interchangeable imaging heads is configured to operate in a different modality. In some aspects, at least two of the interchangeable imaging heads are configured to operate in the same modality.

In some aspects, the portable imaging platform provides a field of view (FOV) ranging from 0.1 mm² to 100 cm² and a spatial resolution ranging from 1 μm to 15 μm for each of the interchangeable imaging heads. Importantly, the field of view and spatial resolution can be different for different ones of the interchangeable imaging heads In some aspects, the portable electronic device further comprises data processing capability to analyze each of the unique optical signals from each of the interchangeable imaging heads, and output capabilities to characterize each of the unique optical signals. In some aspects, the characterization comprises an image, an enhanced image, at least one quantitative value, and/or at least one qualitative result based upon the analysis of each of the unique optical signals.

In some aspects, each of the unique optical signals passes from at least one independently selected objective lens disposed in each of the interchangeable imaging heads to the camera element. In some aspects, the at least one independently selected objective lens disposed in each of the interchangeable imaging heads has a focal length ranging from 1 mm to 3 cm and a numerical aperture (NA) ranging from 0.1 to 1.5.

In some aspects, the base attachment comprises a laser diode, at least one battery, and a switch. In some aspects, each of the interchangeable imaging heads comprises a light source disposed therein and/or is optically connected of the laser diode. The light source and/or the laser diode is configured to produce an excitation light.

The portable imaging platform can be configured to measure samples within an imaging head or to act as a "reader" for external samples. Therefore, in some aspects, the portable imaging platform comprises an independently selected sample holder disposed within at least one of the interchangeable imaging heads and positioned along an optical path between the excitation light and the camera element, wherein the sample holder is configured to accept a sample. In some aspects, a reflective optical path of the excitation light of at least one of the interchangeable imaging heads is configured to exit the interchangeable imaging head through a port, strike an external sample, and reflect back into the interchangeable imaging head through the port.

In some aspects, at least one of the interchangeable imaging heads operates in the brightfield microscopy modality and comprises a) a light source configured to provide an excitation light; b) a sample holder configured to accept a sample and be movable in a z direction; c) a focusing stage, configured to move the sample holder in the z direction; d) a diffuser interposed between the light source and the sample holder; and e) at least one lens disposed between the sample holder and the camera element. The light source and the camera element are the distal points of a transmissive optical path and the diffuser, the sample holder, and the at least one lens are aligned along the transmissive optical path. In some aspects the at least one of the interchangeable imaging heads operates in the brightfield microscopy modality further comprises a) a cell battery configured to power the light source; and b) a power switch configured to activate the light source. In some aspects, the light source is a white LED diode. In some aspects, the focusing stage comprises a miniature dovetail stage, the diffuser comprises paper, and/or the at least one lens comprises a singlet lens and/or a lens module. In some aspects, the portable imaging platform further comprises deconvolution capability to enhance the brightfield image.

In an embodiment involving the fluorescent mode, different from previous smartphone fluorescence microscopes, an epifluorescence illumination configuration is implemented. This design has several advantages over the previous tilted illumination design: (1) it provides a vertical illumination and epi-detection, which allows maximizing the performance of emission filter, improves background noise rejection, and therefore enhances the signal-to-noise ratio (SNR) and detection sensitivity; (2) it brings better illumination uniformity and adjustable illumination area by incorporating a miniature beam expander; (3) it reduces the size and weight of moving parts to the sample slide itself, while in the previous design the excitation light source has to be moved together with the sample slide during focusing. As such, the portable imaging platform of the present invention significantly improves the robustness and mechanical stability of the compared to currently available devices.

In some aspects, at least one of the interchangeable imaging heads operates in the fluorescence microscopy modality and comprises a) a beam expansion module interposed between the laser diode module and the dichroic mirror and configured to receive and magnify the excitation light; b) a dichroic mirror disposed 45 degrees to the magnified excitation light and configured to divert the magnified excitation light 90 degrees on a path to an objective lens module and configured to allow an emission light to pass from the objective lens module to an emission filter; c) the objective lens module interposed between the dichroic mirror and the sample holder and configured to receive the magnified excitation light from the dichroic mirror and focus the magnified excitation light onto a sample holder and to collect the emission light, wherein the emission light is produced when the focused excitation light hits a sample on the sample holder and excites any fluorophores therein; d) the sample holder configured to accept a sample, receive the focused excitation light from the objective lens module, and be movable in a z direction; e) a focusing stage, configured to move the sample holder in the z direction; and f) the emission filter interposed between the dichroic mirror and the camera element and configured to reject any reflective excitation light and allow the emission light to pass to the camera element. In some aspects, the sample is opaque. In some aspects, the sample is transparent. In some aspects, the beam expansion module comprises two or more singlet lenses. In some aspects, the at least one of the interchangeable imaging heads operating in the fluorescence microscopy modality further comprises a white LED which can be used as a light source for pre-focusing.

In some aspects, the at least one of the imaging heads operates in the epifluorescence microscopy modality and comprises a) a beam expansion module interposed between the laser diode module and the dichroic mirror and configured to receive and magnify the excitation light; b) a dichroic mirror disposed 45 degrees to the magnified excitation light and configured to divert the magnified excitation light 90 degrees on a path to an objective lens module and to allow an emission light to pass from the objective lens module to an emission filter; c) the objective lens module interposed between the dichroic mirror and a port on the at least one of the imaging heads, wherein the objective lens is configured to receive the magnified excitation light from the dichroic mirror and focus the magnified excitation light through the port and onto a sample and to collect the emission light from the sample through the port, wherein the emission light is produced when the focused excitation light hits the sample and excites any fluorophores therein, wherein the sample is external to the at least one of the imaging heads; d) the port configured to allow optical communication between the at least one of the imaging heads and the sample; e) the emission filter interposed between the dichroic mirror and the camera element and configured to reject any reflective excitation light and allow the emission light to pass to the camera element. In some aspects, the sample is opaque. In some aspects, the sample is transparent. In some aspects, the sample is a part of silicon wafers, metal films, human skin, or thick biopsy specimen tissues. In some aspects, the beam expansion module comprises two or more singlet lenses. In some aspects, the at least one of the interchangeable imaging heads operating in the epifluorescence microscopy modality further comprises a white LED which can be used as a light source for pre-focusing.

According to yet another embodiment of the present invention, a portable microscopy method utilizes a portable imaging platform comprising, a) a portable electronic device, b) a base attachment, and c) at least two interchangeable imaging heads. The portable electronic device has a camera element. The base attachment is configured for a first side to separably connect to the portable electronic device and for a second side to separably connect to an interchangeable imaging head. Each of the interchangeable imaging heads is configured to separably secure to the second side of the base attachment. The interchangeable imaging head secured to the base attachment is optically coupled to the camera element. Each of the interchangeable imaging heads is configured to send a unique optical signal to the camera element. The base attachment comprises a laser diode, at least one battery, and a switch. Each of the interchangeable imaging heads comprises a light source disposed therein and/or is optically connected to the laser diode. The light source and/or the laser diode is configured to produce an excitation light. Access to a sample is provided by 1) a sample holder disposed within at least one of the interchangeable imaging heads and positioned in an optical path between the excitation light and the camera element, wherein the sample holder is configured to accept a sample and/or 2) the reflective optical path of the excitation light of at least one of the interchangeable imaging heads is configured to exit the interchangeable imaging head through a port, strike a sample, and reflect back into the interchangeable imaging head through the port, wherein the sample is external to the at least one of the imaging heads. The method comprises the steps of a) attaching a first one of the interchangeable imaging heads to the base attachment; b) prepping for sample analysis by 1) loading a sample into the sample holder, if the sample holder is disposed in the attached interchangeable image head, or 2) aiming the portable imaging platform at a sample, whereby the port and the sample are in optical communication, if the attached interchangeable imaging head has a port; c) illuminating the sample with the excitation light; and sending the unique optical signal to the camera element.

The method can be applied using any combination of aspects of the portable imaging platform described above.

In some aspects, the method further comprises the steps of a) detaching the attached interchangeable imaging head from the base attachment; b) attaching a next one of the interchangeable imaging heads to the base attachment; c) preparing for sample analysis by either, 1) loading a sample into the sample holder, if the sample holder is disposed in the attached interchangeable image head, or 2) aiming the portable imaging platform at a sample, whereby the port and the sample are in optical communication, if the attached interchangeable image head has a port; d) illuminating the sample with the excitation light; e) sending the unique optical signal to the camera element; and f) optionally, repeating steps a) through e).

Figure 1B:
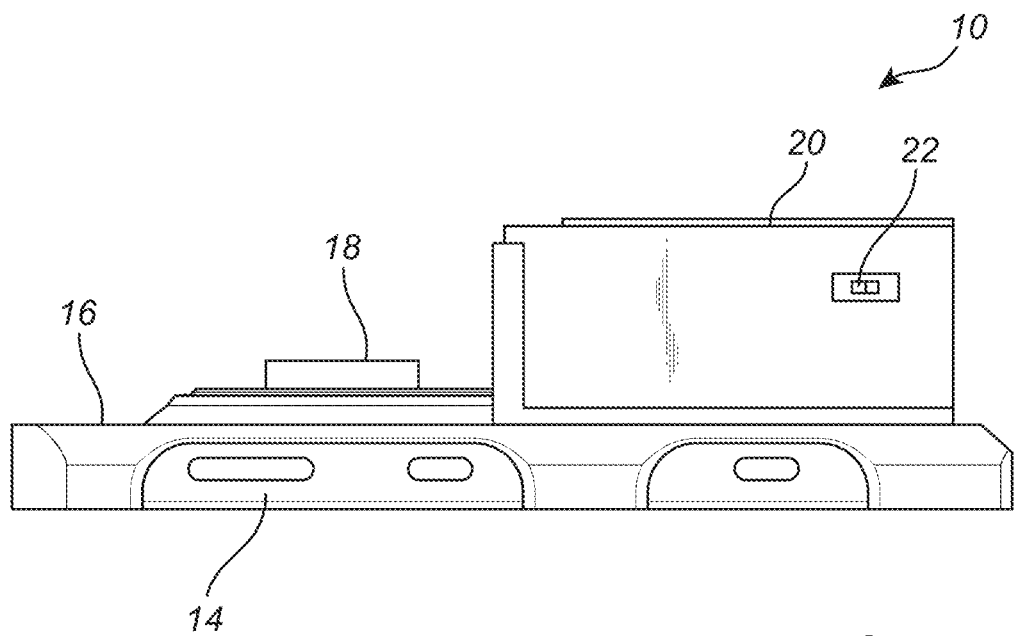

The portable imaging platform of the present invention is based on a modular design, where the interchangeable imaging heads (for example, one for brightfield and one for fluorescence imaging) attach to a common base attachment which is mounted on a portable electronic device, such as a smartphone. FIGS. 1a and 1b show base attachment 10 connected to smartphone 14. Base attachment 10 has a first side (not shown) which is configured to separably connect to the smartphone 14 and a second side 16, which is on the reverse side of the first side and is configured to separably connect to an interchangeable imaging head (not shown) at base connector 18. Base attachment 10 also contains a laser diode and batteries (not shown) inside encasement 20 for the fluorescence imaging modality. Laser switch 22 can be used to turn on the laser diode (not shown).

Figure 2A:
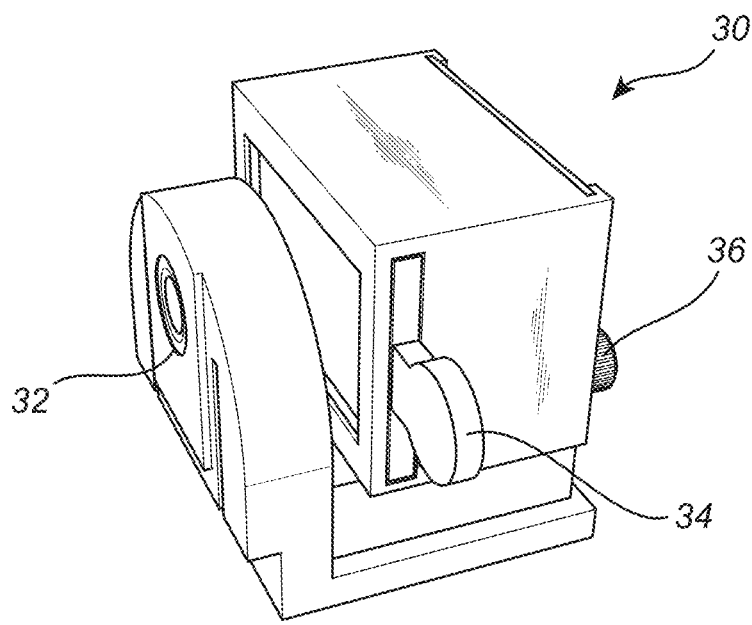
FIG. 2a is a perspective view of a detached brightfield imaging head of an embodiment of the present invention.
Figure 2B:
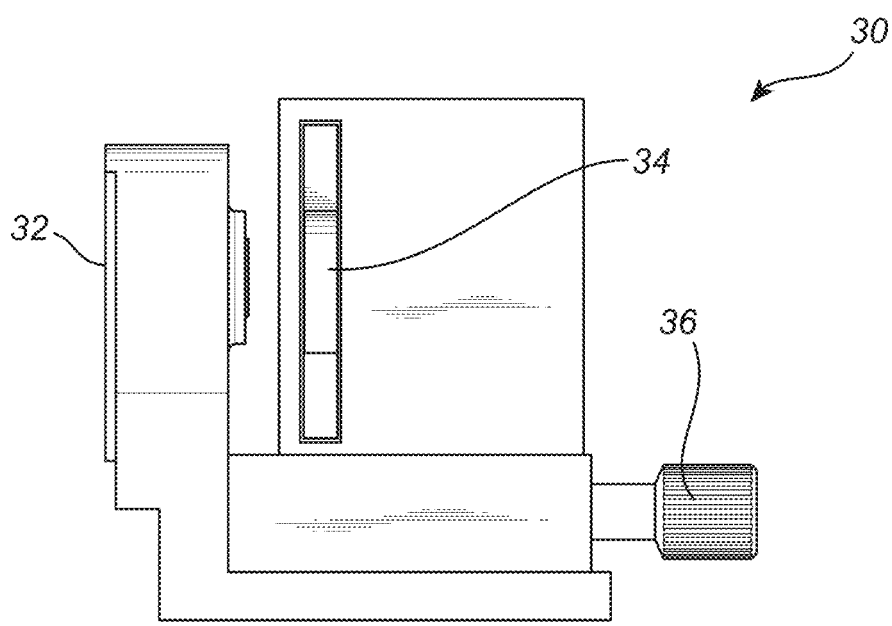
Figure 2C:
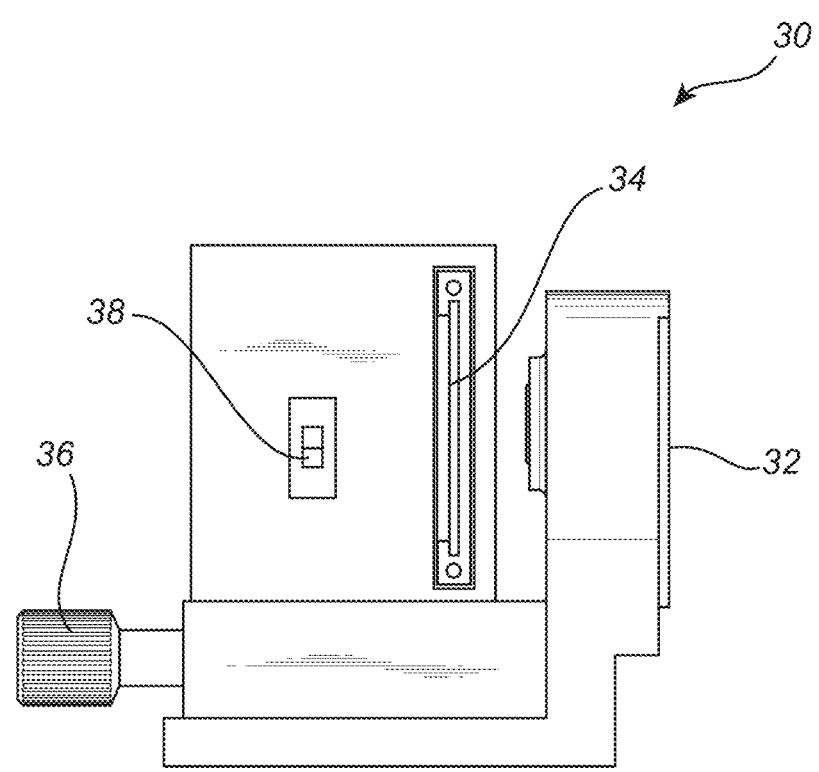
FIG. 2c is an opposite side view of the detached brightfield imaging head of FIG. 2b.

FIG. 2a shows a perspective view of a brightfield imaging head 30 and FIGS. 2b and 2c show two opposite side views of brightfield imaging head 30. The brightfield imaging head 30 is based on a transmission illumination design by using a white LED (not shown) as the light source. The brightfield imaging head is configured to separably connect to base attachment 10 at base connector 18 via imaging head connector 32. Brightfield imaging head 30 has a removable sample tray 34 for sample placement within the imaging head 30 and focusing stage 36 which can facilitate movement of sample tray 34 in the z direction. Power switch 38 can be used to turn on the white LED (not shown).

Figure 2D:
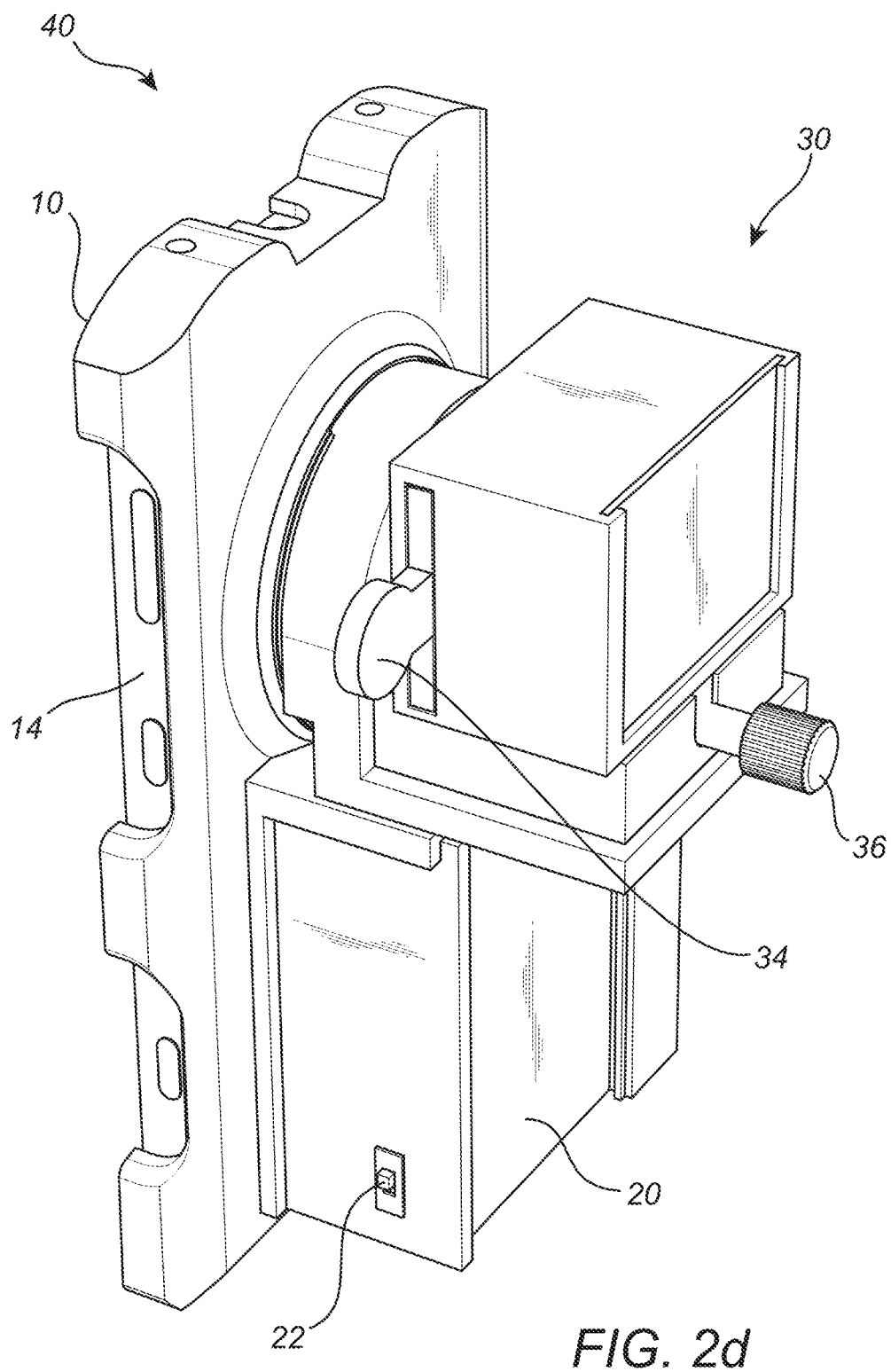
FIG. 2d is a perspective view of the assembled brightfield imaging device of an embodiment of the present invention.
Figure 2E:
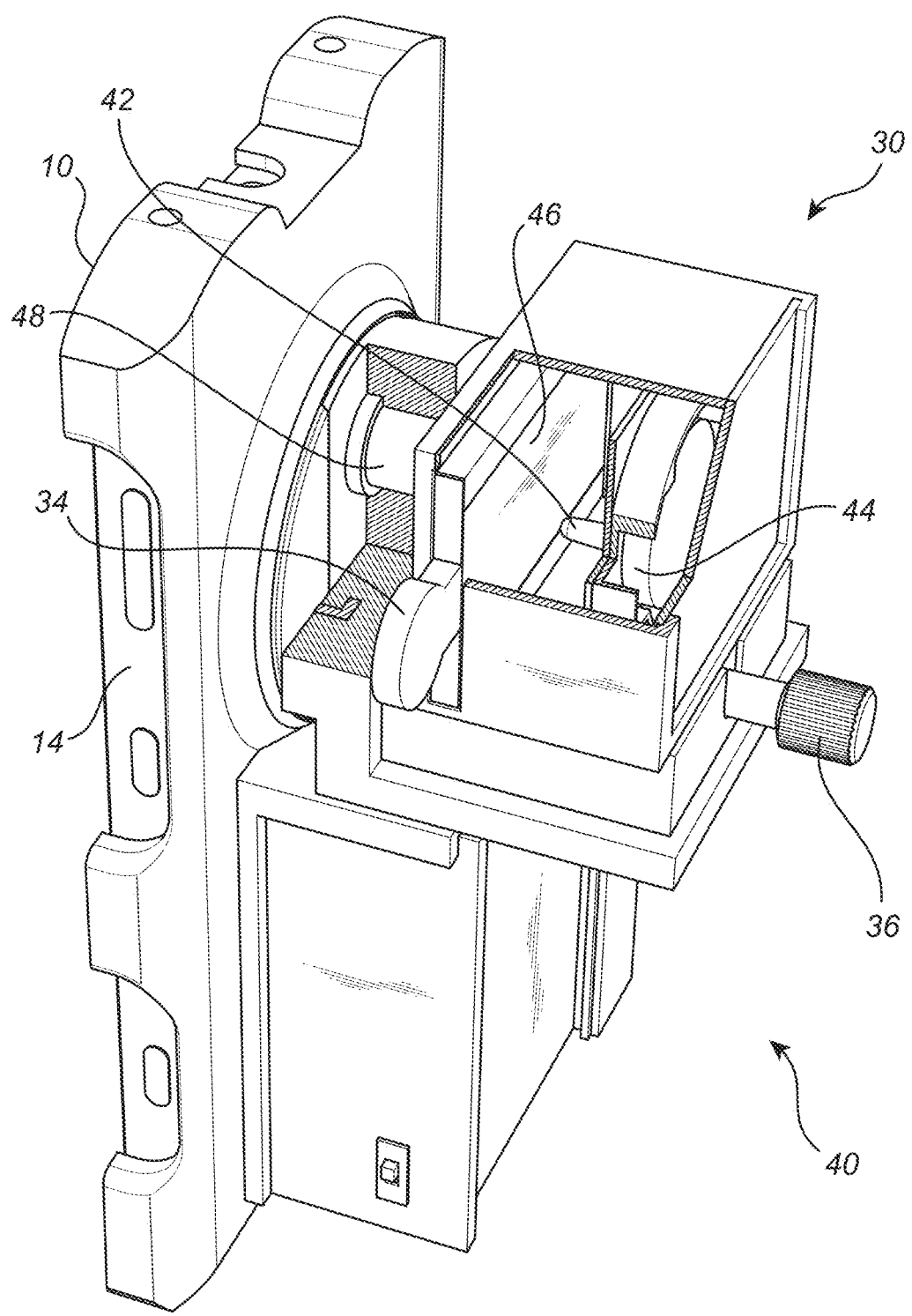
FIG. 2e is another perspective view of the imaging device of FIG. 2d with a portion of the housing detached to expose the interior design of the brightfield imaging head.

FIGS. 2d and 2e show different views of an embodiment of an assembled portable imaging platform 40 with a brightfield imaging head 30 secured to a base attachment 10 which is also mounted on a smartphone 14. FIG. 2e shows the internal components of an embodiment of the brightfield imaging head 30 with a white LED light 42, powered by a cell battery 44, and activated by power switch 38. The white LED light 42 provides excitation light which passes through a diffuser 46 on its way to the sample tray 34. The light passes through the sample tray 34 to the objective lens 48 and then to the camera element (not shown) of the smartphone 14. The brightfield imaging head 30 also integrates a small translational stage (not shown) connected to the sample tray 34 which can be moved in the z direction via focusing stage 36.

Figure 3A:
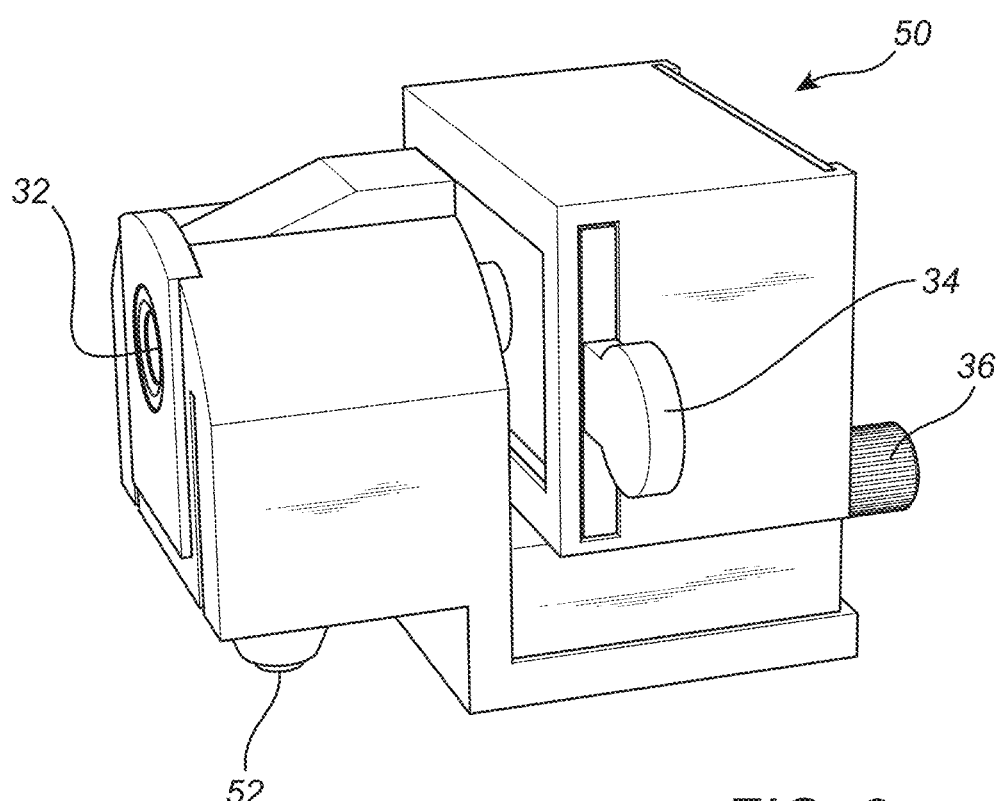
FIG. 3a is a perspective view of a detached epifluorescence imaging head of an embodiment of the present invention.
Figure 3B:
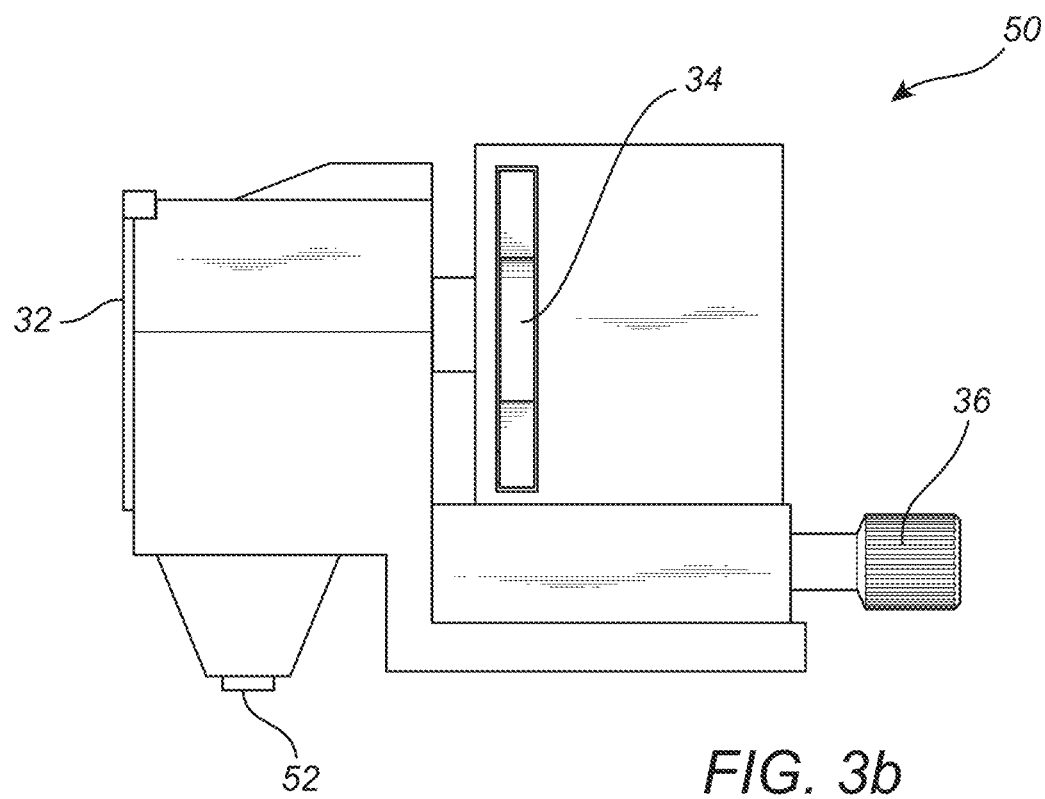
Figure 3C:
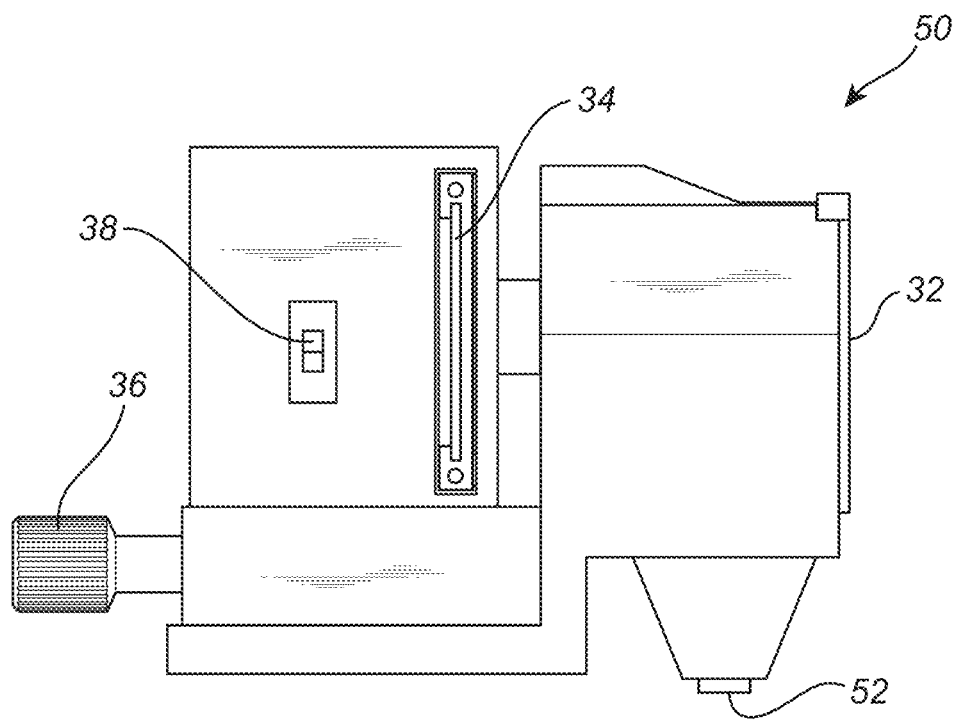
FIG. 3c is the opposite side view of the detached epifluorescence imaging head of FIG. 3b.

FIG. 3a shows a perspective view of a fluorescence imaging head 50 which utilizes an epifluorescence optical configuration and FIGS. 3b and 3c show two opposite side views of fluorescence imaging head 50. The fluorescence imaging head is configured to separably connect to base attachment 10 at base connector 18 via imaging head connector 32. Fluorescence imaging head 50 has a removable sample tray 34 for sample placement within the imaging head 50 and focusing stage 36 which can facilitate movement of sample tray 34 in the z direction. Power switch 38 can be used to turn on a white LED (not shown) useful for sample focusing. Fluorescence imaging head 50, also has opening 52 configured to receive excitation light from the laser diode (not shown).

Figure 3D:
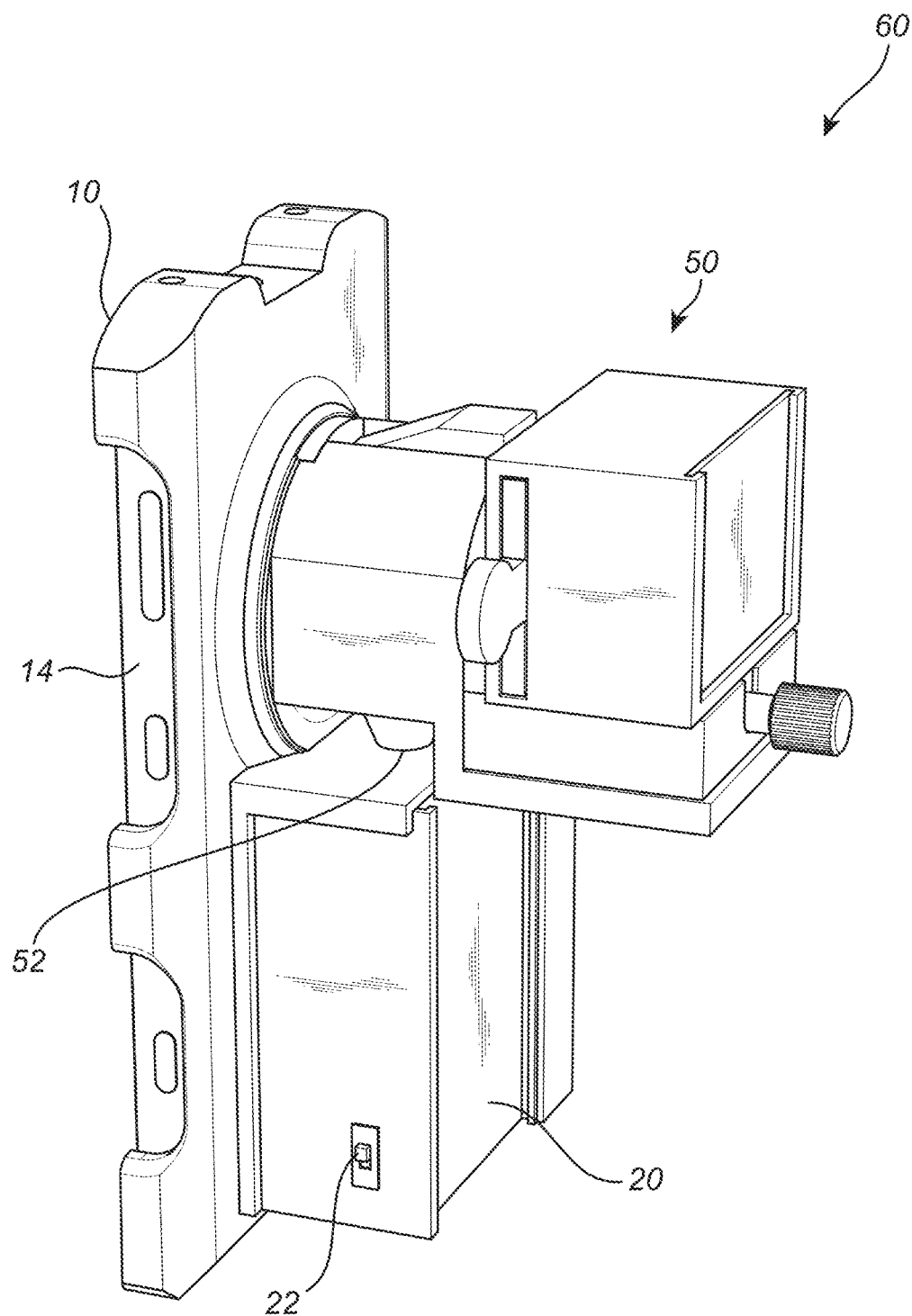
FIG. 3d is a perspective view of the assembled epifluorescence imaging device of an embodiment of the present invention.
Figure 3E:
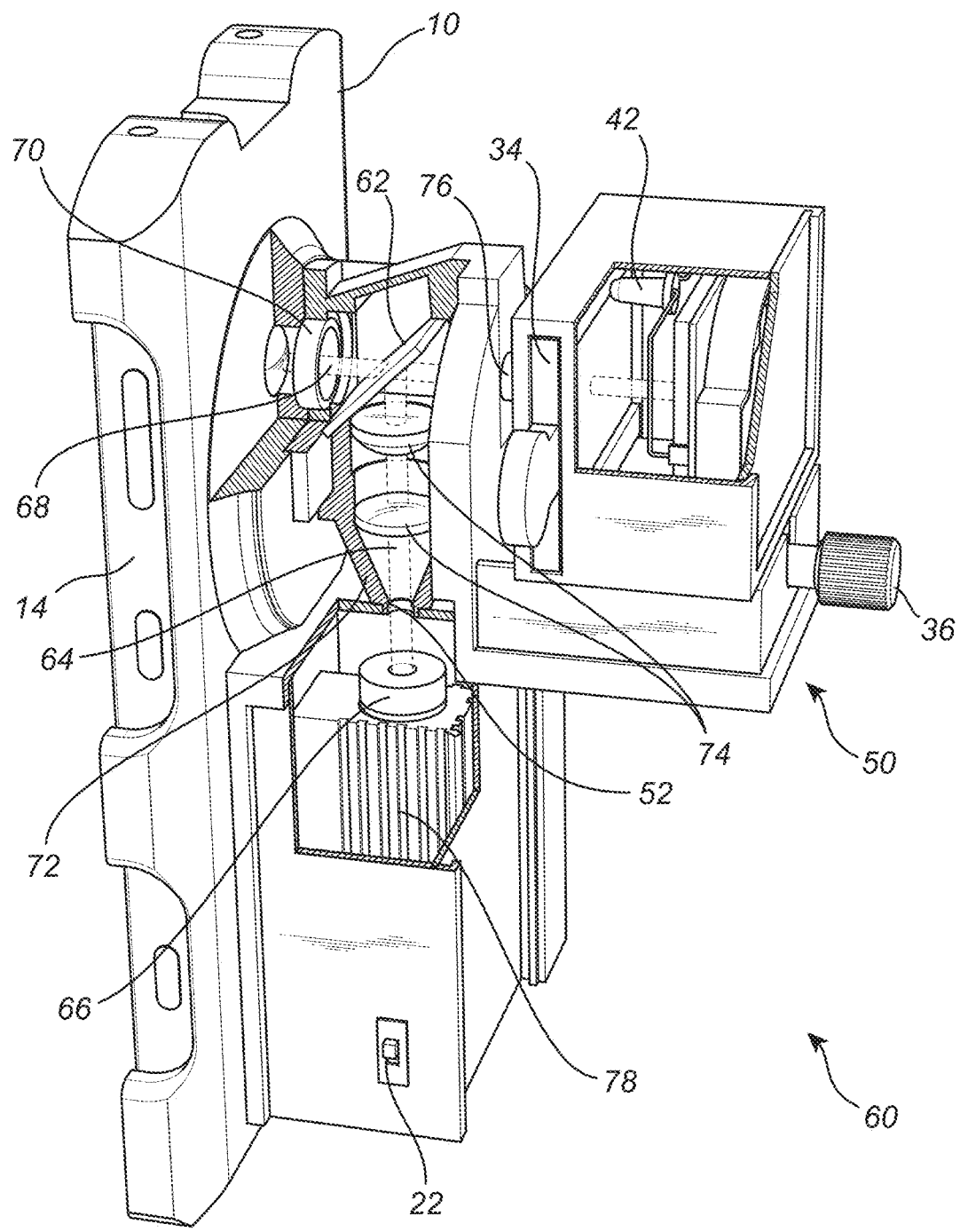
FIG. 3e is another perspective view of the imaging device of FIG. 3d with a portion of the housing detached to expose the interior design of the epifluorescence head.

FIGS. 3d and 3e show different views of an embodiment of an assembled portable imaging platform 60 with a fluorescence imaging head 50 secured to a base attachment 10 which is also mounted on a smartphone 14. FIG. 3e shows the internal components of an embodiment of the fluorescence imaging head 50 and base attachment A dichroic mirror 62 placed 45 degrees to the excitation light 64 functions as a beam splitter to deflect excitation light 64 from a compact laser diode 66 and to allow emission light 68 from the sample to pass through to the smartphone camera lens (not shown). In addition to the focusing stage 36 and emission filter 70, the imaging head 50 also includes a beam expansion module 72 comprised of two singlet lenses 74 to expand the diameter of the laser beam by around 2.6× in order to fulfill the back aperture of the objective lens module 76. A white LED 42 is also shown and can be used for illumination to facilitate sample searching and initial focusing. A heat sink 78 for absorbing heat from the compact laser diod 66 and laser switch 22 for activating the laser diod 66 are also shown.

In some embodiments, the portable imaging platform comprises a monochromic camera-embedded smartphone. In some embodiments, the portable imaging platform further comprises signal enhancement strategies, such as surface-enhanced fluorescence (SEF).

EXAMPLES

Example 1—Testing Spatial Resolution and Field of View for Brightfield and Fluorescence Imaging Heads A dual function smartphone microscope was made of 3D-printed optomechanical attachments and a Nokia Lumia 1020 smartphone. The 3D-printed attachments were designed using Autodesk Inventor and prepared by 3D printing (Stratasys uPrint SE plus), which included a base attachment to be mounted on the smartphone and two interchangeable imaging heads for different functions. Both imaging heads could be slid into the base attachment to form a standalone handheld device for brightfield or epifluorescence imaging applications, respectively. In the assembled brightfield device, a ½" dovetail translation focusing stage (DT12, Thorlabs) was mounted above the external lens for focusing adjustment. The imaging module contained a white LED (3.2 V, 897-1183-ND, Digikey) powered with a coin cell battery (CR2032) for illumination, a glass slide sample holder, and two pieces of filter paper as diffuser placed between the light source and the sample. A lens module ($f_2$=2.6 mm, UCTronics) was placed right in front of the smartphone camera as the objective. The smartphone carries a ⅔-inch, 38 megapixels (5360×7152) complementary metal-oxide semiconductor (CMOS) image sensor. The lens on the smartphone camera has a focal length of $f_1$=6.86 mm. Therefore, the magnification of the brightfield imaging system was: $M=f_1/f_2≈2.6×$.

The base attachment had a green laser diode (532 nm, <150 mW, Z-bolt) powered by 2 AA batteries connected with a heatsink. When the epifluorescence imaging head was secured to the base attachment, the laser beam was expanded by a beam-expander module comprised of a concave lens ($f_3$=−9 mm, #84-378, Edmund Optics) and a convex lens ($f_4$=24 mm, #65-480, Edmund Optics) which together gave a beam magnifying power $MF=-f_4/f_3≈2.6×$. After passing the beam focusing lens ($f_5$=15 mm, #69-387, Edmund Optics) the beam was deflected by 90 degrees using a dichroic mirror (#34-736, Edmund Optics) with the cut-on wavelength of 552 nm. The beam was focused again by an objective lens module ($f_6≈8$ mm, DTR's laser shop) before reaching the sample. A 585 nm band-pass filter (#33-906) was placed in front of the smartphone camera as an emission filter to collect fluorescence from the sample. A micro focusing stage and a sample holder were also placed in the epifluorescence imaging head similar to the ones on the brightfield imaging head. A white LED (3.2 V, 897-1183-ND, Digikey) powered with a cell battery was used as a light source for pre-focusing.

Figure 4:
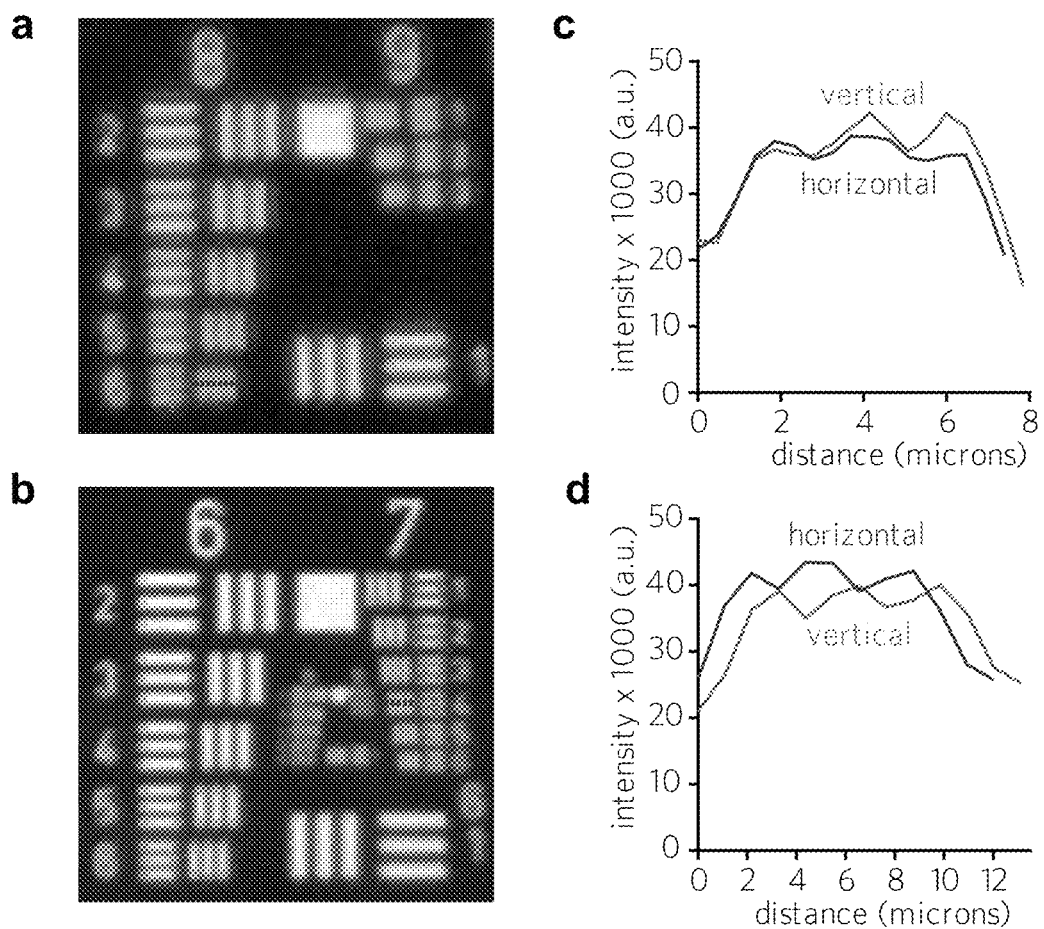

To test the spatial resolution of the portable imaging platform, a USAF 1951 resolution test target was imaged with brightfield and epifluorescence imaging heads attached (in brightfield mode), respectively. The resolution target was placed between the white LED and the smartphone camera in both imaging heads. Using the brightfield imaging head as shown in FIG. 2a-2e the raw spatial resolution was 1.23 μm (FIGS. 4a and 4c) and a field of view (FOV) of ~0.8 mm² was obtained in brightfield mode. This FOV is roughly about the same to that achieved on a benchtop microscope with a 10× objective. We next evaluated the performance of the fluorescence imaging head. The fluorescence imaging module provided both a large FOV (~1.5 mm²) and a fine lateral resolution of 2.6 μm (FIGS. 4b and 4d) in the brightfield mode.

Example 2—Imaging Fluorescent Microbeads

The smartphone imaging of fluorescent microbeads was performed on the portable imaging platform with the epifluorescence imaging head attached to quantify the sensitivity. Red polystyrene microspheres (FluoSpheres™, 580 nm/605 nm, Thermo Fischer) with diameters ranging from 1 μm to 200 nm were used. Suspension of fluorescent microsphere was diluted 5,000-1,000,000 times depending on the size of the microsphere for the desired density of microspheres in a field of view. The glass coverslip was rinsed with acetone, isopropanol, and methanol, blow-dried, and finally treated with plasma for a few seconds. 1 μL diluted microsphere suspension was added to the coverslip and dried in air. The sample was then inserted into the coverslip holder of the fluorescence imaging head for imaging. The white LED was first used to focus the sample before the laser was turned on to minimize photobleaching and laser overheating. An integration time of 2 seconds and an ISO value of 400 was used in the imaging of 100 nm microspheres. To validate single nanoparticle imaging, the same fluorescent nanoparticle sample used in the sensitivity test was also imaged by a benchtop inverted microscope (Olympus IX83). The fluorescent sample was imaged by using a 100× oil objective lens (NA=1.40) of the same area imaged by the smartphone microscope. Digital images were acquired in Cy3 channel with an integration time of is by using a scientific CMOS camera (Hamamatsu Flash4.0).

Figures 5A, 5B:
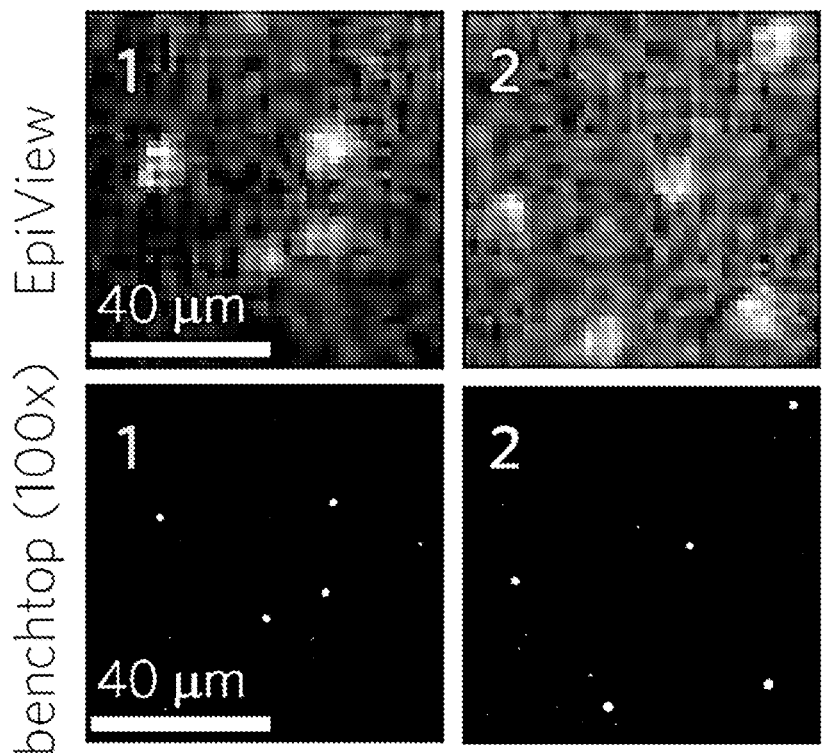
FIGS. 5a and 5b are two enlarged images of 100 nm red fluorescent microbeads obtained from an embodiment of the present invention using the epifluorescence imaging head compared to the same images from a benchtop microscope.

The portable imaging platform using the epifluorescence imaging head was able to record weak fluorescent signals from low-density single nanoparticles prepared on a glass slide. Representative ROIs were selected and scanned by the portable imaging platform (labeled EpiView) and benchtop microscope side-by-side (FIGS. 5a and 5b). The fluorescent spots in the portable imaging platform images can be perfectly matched to the locations of spots in the conventional microscope images. It is worth mentioning that 100-nm fluorescent beads were previously the smallest nanoobjects that can be imaged in the earlier version of smartphone microscopes based on oblique illumination. Our new portable imaging platform demonstrates a comparable detection sensitivity but significantly improves the device robustness and stability.

Example 3—Brightfield Image Deconvolution

Brightfield image deconvolution was conducted using Lucy-Richardson algorithm in MATLAB. Before starting the deconvolution, the point spread function (PSF) of the smartphone microscope was measured by imaging single 500-nm polystyrene microbeads in the brightfield mode. To obtain the PSF image, totally 20 single microbeads were averaged. The averaged image of the single microbead was then split into red (R), green (G) and blue (B) channels. The central 2 by 2 pixels were used as the PSF of each color channel during the deconvolution process. To deconvolve, the original smartphone brightfield images were also split into R, G and B channels. Then, each channel was deconvoluted separately with the corresponding PSF of that channel. The deconvoluted single-channel images were then merged together in ImageJ to generate the deconvoluted RGB image with enhanced resolution and contrast. The intensity value of each deconvoluted color channel was manually adjusted in ImageJ to compensate for the color difference before and after deconvolution.

Figure 6:
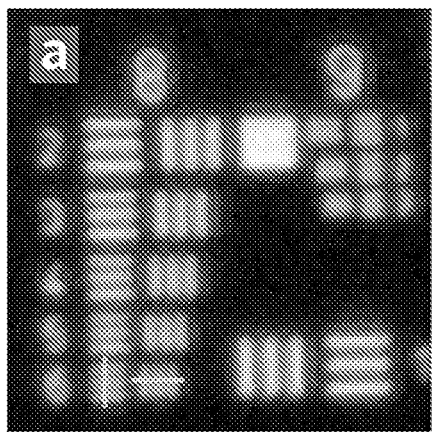
Figure 6:
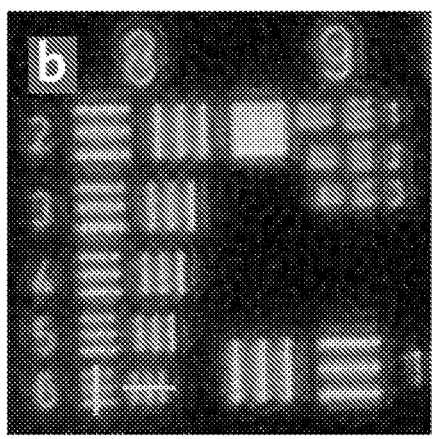
Figure 6:
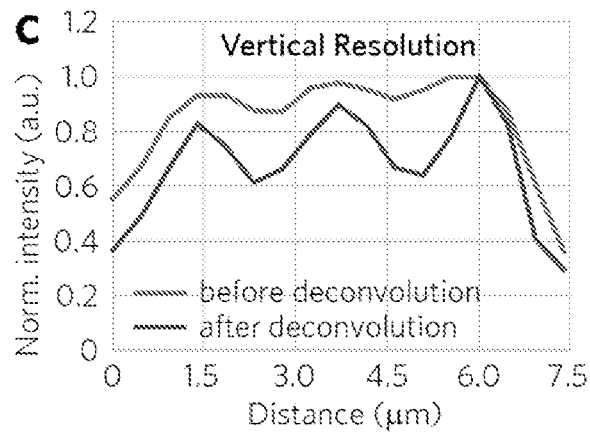
Figure 6:
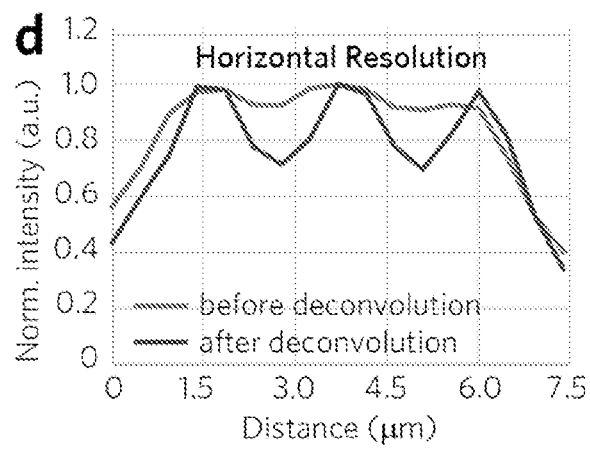
Figure 6:
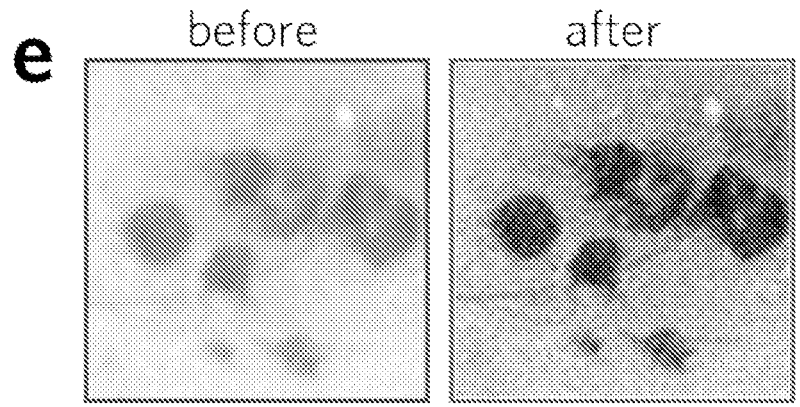
Figure 7:
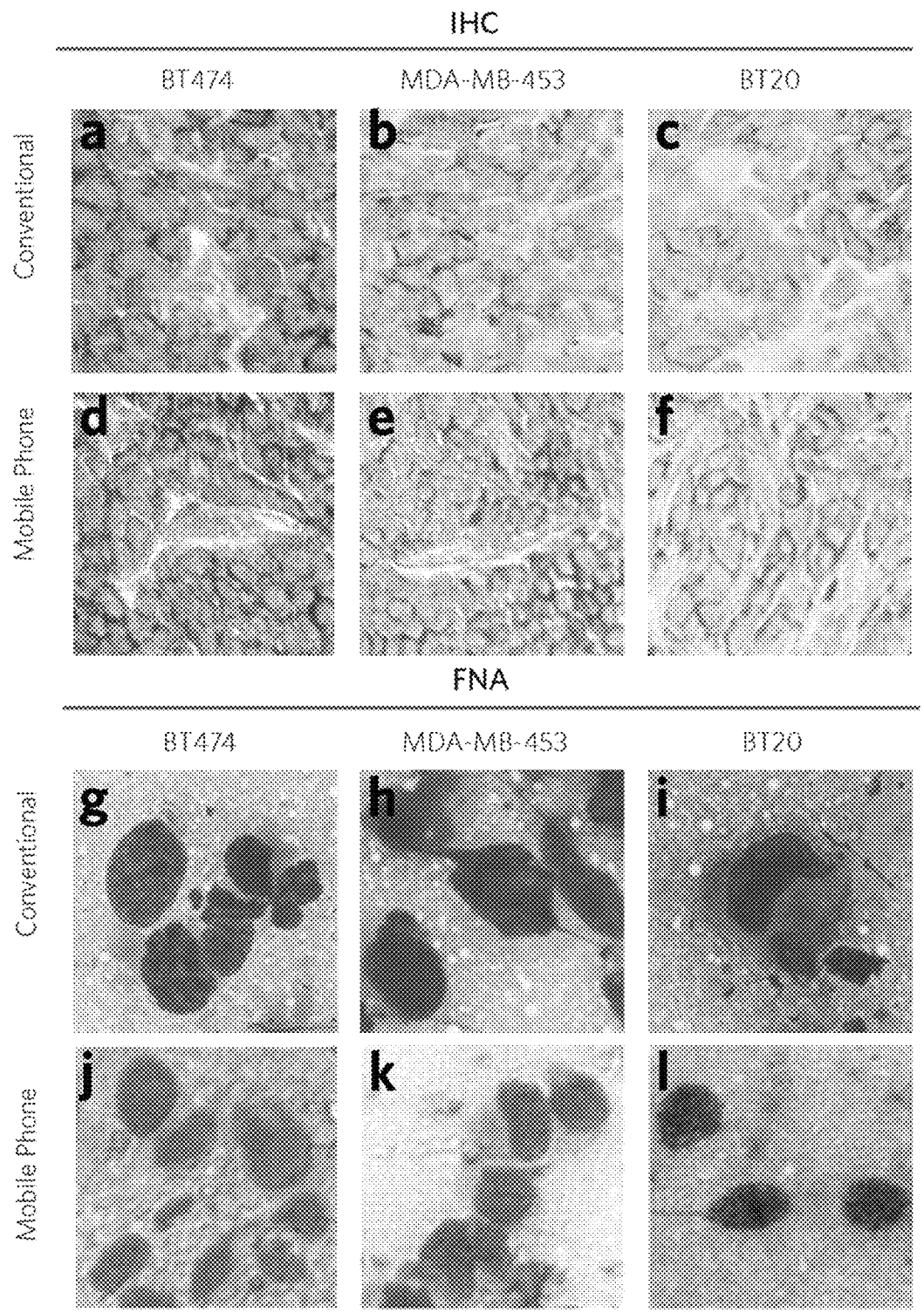
FIGS. 7a-7f is a side-by-side comparison between three images of sectioned breast tumor specimens taken on a standard benchtop microscope and three images and three images taken with an embodiment of the present invention using a brightfield imaging head.
FIGS. 7g-7l is a side-by-side comparison between three images of FNA specimens taken on a standard benchtop microscope and three images taken with an embodiment of the present invention using a brightfield imaging head.

After deconvolution, the spatial resolution was improved from the raw spatial resolution of 1.23 μm to 1.10 μm, leading to noticeably improved visualization of cellular details and image contrast (FIG. 6a-6e). FIG. 6a is the same image of a region of interest (ROI) in a transmission image of the USAF 1951 resolution test target captured using a brightfield imaging device. FIG. 6b is the improved image of FIG. 6a after deconvolution. FIGS. 6c and 6d are graphical representations of the vertical and horizontal line intensity profiles before and after deconvolution. FIG. 6e shows images of cytology sampled via fine-needle aspiration (FNA) from animal models of human breast cancer. The images were taken with the portable imaging platform using a brightfield imaging head, and unprocessed images and deconvoluted images are shown side-by-side. These images demonstrate that the deconvolution of brightfield images has effectively enhanced the resolution and contrast of the images. The results suggest that subnuclear features from a single cell can be readily resolved by the present invention (FIG. 6e). This spatial resolution and FOV is sufficient to analyze the cytological features captured from the FNA slides.

Example 4—Capturing Images of FNA and HER2-IHC slides

The brightfield imaging was performed on the inventive portable imaging platform to capture the images of both FNA and HER2-IHC slides. To do so, a sample slide was inserted to the sample holder of the brightfield imaging head, followed by turning on LED and focusing. The built-in smartphone camera app (Nokia Camera Pro) was used for digital image acquisition. An integration time of 0.4 seconds and an ISO value of 200 was used for both FNA slides and HER2-IHC slides. All the images were stored as a lossless raw format (DNG file), which can be converted to the TIFF file for further analysis with ImageJ or MATLAB. FIG. 7a-7f show brightfield images of sectioned breast tumor specimens stained by IHC in the standard fashion, which were taken by both the inventive portable imaging platform and a standard microscope. A comparison of these images demonstrates the new platform can provide a much larger FOV than that of the conventional microscope. FIG. 7g-7l show the comparison of FNA-sampled images captured by the new portable imaging platform and a benchtop microscope side-by-side. The new portable imaging platform not only provides a larger FOV but also maintains sufficient resolution for revealing subcellular details.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A portable imaging platform comprising:
   a) a portable electronic device having a camera element;
   b) a base attachment configured for a first side to separably connect to the portable electronic device and for a second side to separably connect to an interchangeable imaging head; and
   c) at least two of the interchangeable imaging heads, wherein each of the interchangeable imaging heads is configured to separably connect to the second side of the base attachment, wherein the interchangeable imaging head connected to the base attachment is optically coupled to the camera element;

wherein each of the interchangeable imaging heads is configured to send a unique optical signal to the camera element.

2. The portable imaging platform of claim 1, wherein the portable electronic device is a smartphone, and the camera element comprises a lens and an image sensor.

3. The portable imaging platform of claim 1, wherein each of the interchangeable imaging heads is configured to operate in a modality selected from the group consisting of brightfield microscopy, fluorescence microscopy, dark-field scattering microscopy, polarization microscopy, and phase contrast microscopy, and each of the interchangeable imaging heads is configured to image a sample disposed within the interchangeable imaging head or to image the sample exterior to the interchangeable imaging head.

4. The portable imaging platform of claim 3, wherein at least one of the interchangeable imaging heads operates in the brightfield microscopy modality and comprises:
   a) a light source configured to provide an excitation light;
   b) a sample holder configured to accept a sample and be movable in a z direction;
   c) a focusing stage, configured to move the sample holder in the z direction;
   d) a diffuser interposed between the light source and the sample holder; and
   e) at least one objective lens disposed between the sample holder and the camera element;

wherein the light source and the camera element are each a distal points of a transmissive optical path and the diffuser, the sample holder, and the at least one objective lens are aligned along the transmissive optical path.

5. The portable imaging platform of claim 4, further comprising:
   a) a cell battery configured to power the light source; and
   b) a power switch configured to activate the light source, wherein the light source is a white LED diode, wherein the focusing stage comprises a miniature dovetail stage, wherein the diffuser comprises paper, and wherein the at least one objective lens comprises a singlet lens and/or a lens module.

6. The portable imaging platform of claim 4, further comprising deconvolution capability to enhance the brightfield image.

7. The portable imaging platform of claim 1, wherein the portable imaging platform provides a field of view (FOV) ranging from 0.1 mm$^2$ to 100 cm$^2$ and a spatial resolution ranging from 1 µm to 15 µm for each of the interchangeable imaging heads.

8. The portable imaging platform of claim 1, wherein each of the unique optical signals passes from at least one independently selected objective lens disposed in each of the interchangeable imaging heads to the camera element.

9. The portable imaging platform of claim 8, wherein the at least one independently selected objective lens disposed in each of the interchangeable imaging heads has a focal length ranging from 1 mm to 3 cm and a numerical aperture (NA) ranging from 0.1 to 1.5.

10. The portable imaging platform of claim 1, wherein the base attachment comprises a laser diode, at least one battery, and a switch, and wherein each of the interchangeable imaging heads comprises a light source disposed therein and/or is optically connected to the laser diode, wherein the light source and/or the laser diode is configured to produce an excitation light.

11. The portable imaging platform of claim 10, further comprising an independently selected sample holder disposed within at least one of the interchangeable imaging heads and positioned along an optical path between the excitation light and the camera element, wherein the sample holder is configured to accept a sample.

12. The portable imaging platform of claim 11, wherein a reflective optical path of the excitation light of at least one of the interchangeable imaging heads is configured to exit the at least one of the interchangeable imaging heads through a port, strike a sample, and reflect back into the at least one of the interchangeable imaging heads through the port.

13. The portable imaging platform of claim 12, wherein at least one of the interchangeable imaging heads operates in an epifluorescence microscopy modality and comprises:
   a) a beam expansion module interposed between a laser diode and a dichroic mirror and configured to receive and magnify the excitation light;
   b) a dichroic mirror disposed 45 degrees to the magnified excitation light and configured to divert the magnified excitation light 90 degrees on a path to an objective lens module and to allow an emission light to pass from the objective lens module to an emission filter;
   c) the objective lens module interposed between the dichroic mirror and the port on the at least one of the interchangeable imaging heads, wherein the objective lens module is configured to receive the magnified excitation light from the dichroic mirror and focus the magnified excitation light through the port and onto a sample and to collect the emission light from the sample through the port, wherein the emission light is produced when the focused excitation light hits the sample and excites any fluorophores, wherein the sample is external to the at least one of the interchangeable imaging heads;
   d) the port configured to allow optical communication between the at least one of the interchangeable imaging heads and the sample; and
   e) the emission filter interposed between the dichroic mirror and the camera element and configured to reject any reflective excitation light and allow the emission light to pass to the camera element.

14. The portable imaging platform of claim 13, wherein the sample is selected from the group consisting of silicon wafers, metal films, human skin, and thick biopsy specimen tissues.

15. The portable imaging platform of claim 13, wherein the beam expansion module comprises two or more singlet lenses, and wherein the at least one of the interchangeable imaging heads further comprises a white LED.

16. The portable imaging platform of claim 10, wherein at least one of the interchangeable imaging heads is configured to operate in a fluorescence microscopy modality and comprises:

a) a beam expansion module interposed between the laser diode and a dichroic mirror and configured to receive and magnify the excitation light;
b) the dichroic mirror disposed 45 degrees to the magnified excitation light and configured to divert the magnified excitation light 90 degrees on a path to an objective lens module and configured to allow an emission light to pass from the objective lens module to an emission filter;
c) the objective lens module interposed between the dichroic mirror and a sample holder and configured to receive the magnified excitation light from the dichroic mirror and focus the magnified excitation light onto the sample holder and to collect the emission light, wherein the emission light is produced when the focused excitation light hits a sample on the sample holder and excites any fluorophores;
d) the sample holder configured to accept a sample, receive the focused excitation light from the objective lens module, and be movable in a z direction;
e) a focusing stage, configured to move the sample holder in the z direction; and
f) the emission filter interposed between the dichroic mirror and the camera element and configured to reject any reflective excitation light and allow the emission light to pass to the camera element.

17. The portable imaging platform of claim 16, wherein the beam expansion module comprises two or more singlet lenses, and wherein the at least one of the interchangeable imaging heads further comprises a white LED.

18. The portable imaging platform of claim 16, wherein the sample is opaque; or wherein the sample is transparent.

19. A portable microscopy method utilizing a portable imaging platform comprising:
a) a portable electronic device having a camera element;
b) a base attachment configured for a first side to separably connect to the portable electronic device and for a second side to separably connect to an interchangeable imaging head; and
c) at least two of the interchangeable imaging heads, wherein each of the interchangeable imaging heads is configured to separably connect to the second side of the base attachment, wherein the interchangeable imaging head connected to the base attachment is optically coupled to the camera element,
wherein each of the interchangeable imaging heads is configured to send a unique optical signal to the camera element, wherein the base attachment comprises a laser diode, at least one battery, and a switch, wherein each of the interchangeable imaging heads comprises a light source disposed therein and/or is optically connected to the laser diode. wherein the light source and/or the laser diode is configured to produce an excitation light, and further comprising an independently selected sample holder disposed within at least one of the interchangeable imaging heads and positioned along an optical path between the excitation light and the camera element, wherein the sample holder is configured to accept a sample, and wherein a reflective optical path of the excitation light of at least one of the interchangeable imaging heads is configured to exit the at least one of the interchangeable imaging heads through a port, strike a sample, and reflect back into the at least one of the interchangeable imaging heads through the port;
the method steps comprising:
a) attaching a first one of the interchangeable imaging heads to the base attachment
b) prepping for sample analysis by
i. loading a sample into the sample holder, if the sample holder is disposed in the attached interchangeable image head, or
ii. aiming the portable imaging platform at the sample, whereby the port and the sample are in optical communication, if the attached interchangeable image head has the port;
c) illuminating the sample with the excitation light; and
d) sending the unique optical signal to the camera element.

20. The method of claim 19, further comprising:
a) detaching the attached interchangeable imaging head from the base attachment;
b) attaching a next one of the interchangeable imaging heads to the base attachment;
c) prepping for sample analysis by either
i) loading a sample into the sample holder, if the sample holder is disposed in the attached interchangeable image head, or
ii) aiming the portable imaging platform at the sample, whereby the port and the sample are in optical communication, if the attached interchangeable image head has the port;
d) illuminating the sample with the excitation light;
e) sending the unique optical signal to the camera element; and
f) optionally, repeating steps a) through e).

* * * * *